(12) United States Patent
Fisher

(10) Patent No.: US 8,418,341 B1
(45) Date of Patent: Apr. 16, 2013

(54) HYBRID ROBOTIC GRIPPER

(75) Inventor: Trent P. Fisher, Yellow Springs, OH (US)

(73) Assignee: SAS Automation Ltd., Xenia, OH (US)

( * ) Notice: Subject to any disclaimer, the term of this patent is extended or adjusted under 35 U.S.C. 154(b) by 519 days.

(21) Appl. No.: 12/696,541

(22) Filed: Jan. 29, 2010

Related U.S. Application Data

(60) Provisional application No. 61/148,165, filed on Jan. 29, 2009.

(51) Int. Cl.
*B23P 11/00* (2006.01)
*B23P 21/00* (2006.01)

(52) U.S. Cl.
USPC .............................................. 29/443; 29/721

(58) Field of Classification Search ............. 29/428, 29/469, 525.01, 525.02, 721, 743, 242, 243, 29/453, 446; 294/65, 81.2, 64.1; 414/627, 414/737, 752.1; 901/40
See application file for complete search history.

(56) References Cited

U.S. PATENT DOCUMENTS

| | | | |
|---|---|---|---|
| 4,653,793 A | 3/1987 | Guinot et al. | |
| 4,685,714 A | 8/1987 | Hoke | |
| 4,767,143 A * | 8/1988 | Michael et al. | 294/65 |
| 5,152,566 A | 10/1992 | Blatt et al. | |
| 5,161,847 A | 11/1992 | Yakou | |
| 5,387,068 A | 2/1995 | Pearson | |
| 5,993,365 A | 11/1999 | Stagnitto et al. | |
| 6,273,483 B1 | 8/2001 | Bone | |
| 6,416,706 B1 | 7/2002 | Fisher et al. | |
| 6,502,877 B2 | 1/2003 | Schick et al. | |
| 6,722,842 B1 | 4/2004 | Sawdon et al. | |
| 6,796,588 B2 | 9/2004 | Hsieh | |
| 6,863,323 B2 * | 3/2005 | Neveu | 294/65 |
| 7,029,046 B2 | 4/2006 | Lim | |
| 7,611,180 B1 | 11/2009 | Fisher et al. | |
| 7,798,546 B2 * | 9/2010 | Kniss | 294/65 |

* cited by examiner

*Primary Examiner* — John C Hong
(74) *Attorney, Agent, or Firm* — MacMillan, Sobanski & Todd, LLC

(57) ABSTRACT

An End-Of-Arm-Tooling for a robot that includes at least one tool mounted upon a section of channel having a generally cruciform cross sectional shape that includes lobes having an arcuate-shaped portion, one end of the section of channel being adapted to be attached to a robot arm.

18 Claims, 8 Drawing Sheets

HYBRID ROBOTIC GRIPPER

CROSS-REFERENCE TO RELATED APPLICATIONS

This application claims the benefit of U.S. Provisional Application No. 60/148,165, filed Jan. 29, 2009, the disclosure of which is incorporated herein by reference.

BACKGROUND OF THE INVENTION

This invention relates in general to robotic arms and in particular to End-Of-Arm-Tooling.

Robotic arms are used in many industrial and include End-Of-Arm-Tooling that is attached to the robot arm and used to reorient and/or pick up and move articles to or from a specific location. The End-Of-Arm-Tooling is configured for specific applications and must be re-configured when the application is changed. This can often prove a time consuming and hence expensive operation. Accordingly, it would be desirable to provide End-Of-Arm-Tooling that may be easily configured initially and subsequently reconfigured.

SUMMARY OF THE INVENTION

This invention relates to End-Of-Arm-Tooling that is attached to an end of a robotic arm and used to reorient and/or pick up and move articles to or from a specific location.

The present invention contemplates an End-Of-Arm-Tooling for a robot that includes a section of channel having a generally cruciform cross sectional shape. The channel includes lobes having an arcuate-shaped portion and has one end adapted to be attached to a robot arm. The End-Of-Arm-Tooling also includes at least one tool mounted upon the section of channel.

The invention also contemplates a method for attaching a tool to a robot that includes the steps of providing a robot having a controllable movable arm and then attaching a section of channel having a generally cruciform cross sectional shape that includes lobes having an arcuate-shaped portion to the robot arm. The method also includes attaching at least one tool to the section of channel.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
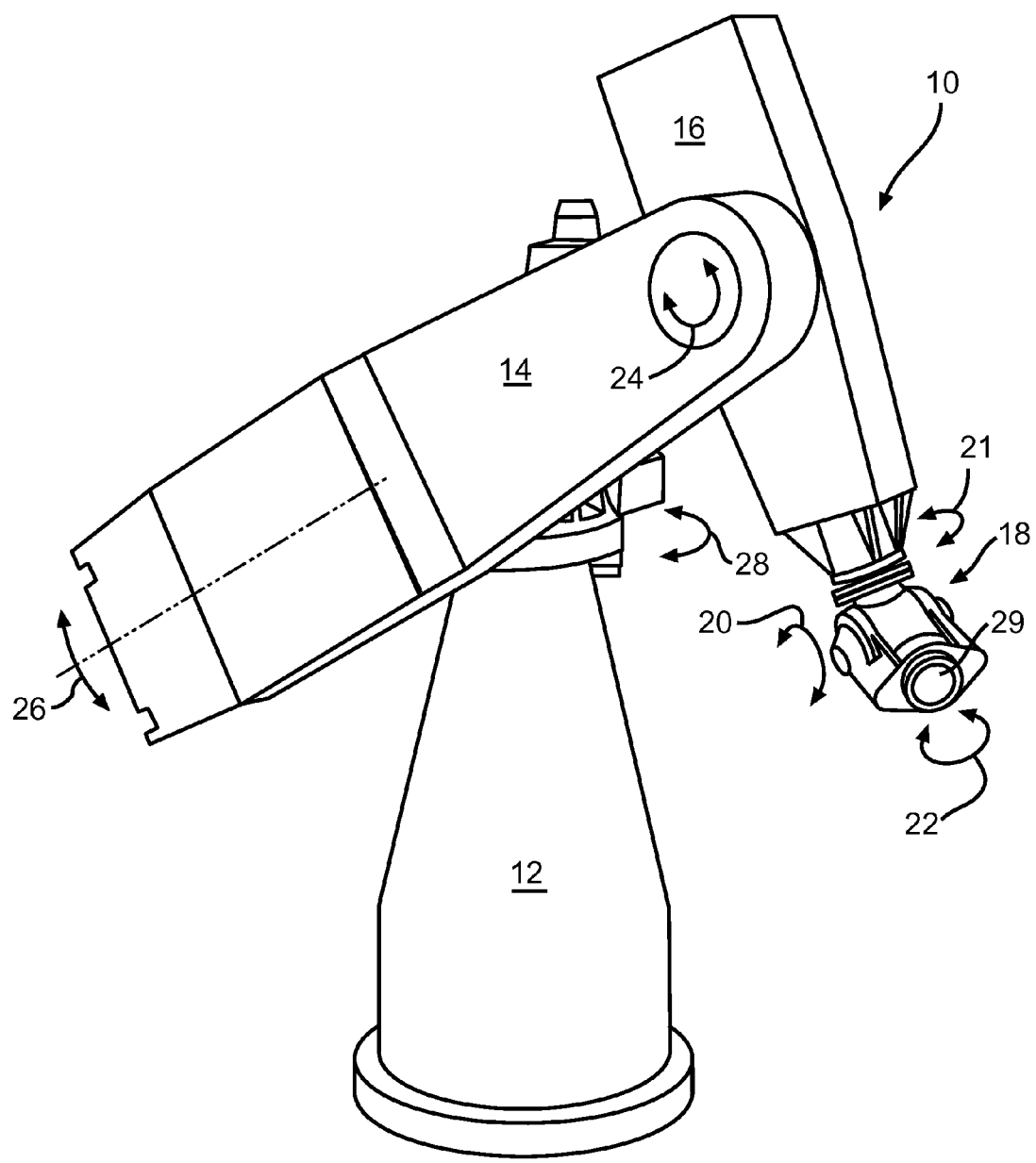
FIG. 1 illustrates a typical six axis industrial robot.

Referring now to the drawings, there is illustrated in FIG. 1 a typical six-axis industrial robot 10. The Robot 10 includes a base 12 upon which an arm 14 is rotatably and pivotably mounted. Extending from the upper end of the arm 14 is a forearm 16 which is capable of being rotated relative to the arm. Attached to the end of the forearm 16 is a multi-axis wrist assembly 18. Motion about each of the six axes is provided by a motor or servo mechanism (not shown). The wrist assembly 18 is provided with three articulations, that is, an up/down rotation indicated by arrow 20, a left/right rotation indicated by arrow 21 and a third pivoting motion indicated by arrow 22. Additionally, an up/down rotation of the forearm 16 relative to the arm 16 is indicated by the arrow 24 while an up/down rotation of the arm 14 relative to the base 12 is indicated by the arrow 26. Finally, the pivoting motion of the arm 14 relative to the base 12 is indicated by the arrow 28. A chuck 29 mounted upon the outer end of the wrist assembly 18 secures End-Of-Arm-Tooling (not shown) to the industrial robot 10.

Figure 2:
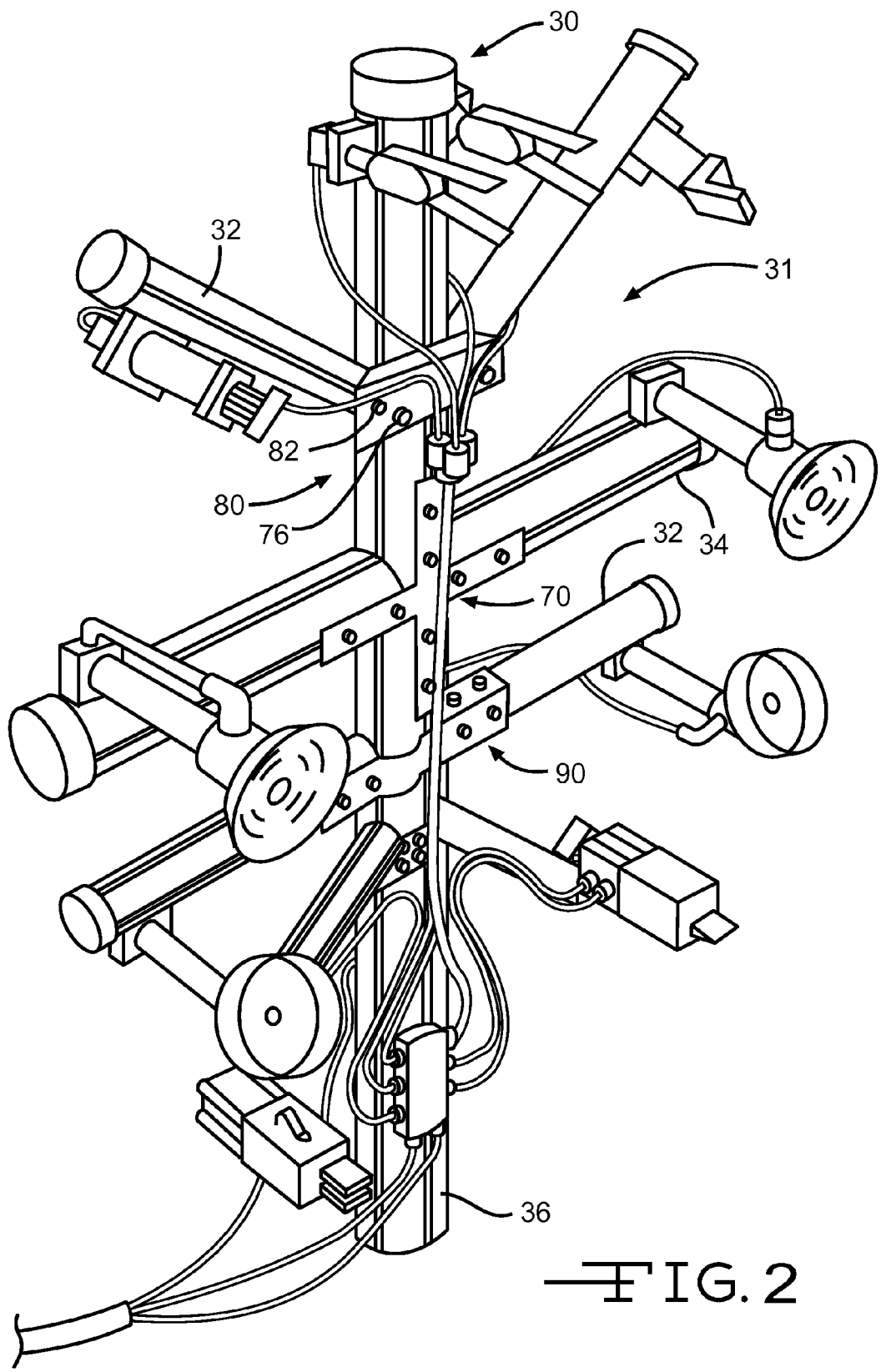
FIG. 2 illustrates an End-Of-Arm-Tooling for attachment to the robot shown in FIG. 1 and that is in accordance with the present invention and that is.

The present invention is directed toward an improved End-Of-Arm-Tooling (EOAT), shown generally in FIG. 2 at 30, that is attached to the wrist assembly 18 of the robot 10. The EOAT 30 comprises a host of different modular systems and components, including brackets, clamps and connectors that are used to hold together a framework 31 of slotted tubular aluminum sections. For especially weight-sensitive applications, the invention contemplates using carbon-fiber sections. The framework 31 is then used to position and support a plurality of tools, such as, for example, suction cups, magnets, pumps, grippers, slides, guides and sensors that serve to grasp, manipulate and ultimately release an actual workpiece. A variety of tools that may be attached to the framework 31 are illustrated in FIG. 2; however, the invention is not limited to utilizing only the tools shown in the figure. The selection and positioning of specific tools is determined to correspond to the application for the EOAT 30. The framework 31 also supports pneumatic and/or hydraulic lines that are used activate the individual tools. The EOAT 30 is attached to the chuck 29 attached to the outer end of the robot wrist assembly 18 by either direct attachment to the chuck or a quick change interface mounted upon the interface (not shown). The quick change interface is described below.

As shown in FIG. 2, the EOAT framework 31 includes a plurality of extending tool holding sections 32 and 34 that are shown having different outside diameters. The tool holding sections 32 and 34 support specific tools and are mounted upon a central section 36 by various brackets that will be further described below. It is noted that, as shown in the upper portion of FIG. 2, tools also may be directly attached to the central section 36. As shown in FIG. 2, the central section 36 has the same outside diameter as the larger diameter tool holding sections 34; however, the invention may be practiced with the central section having a different outside diameter from that of the tool holding sections, as illustrated by the sections labeled 32. While sections having two outside diameters are shown in FIG. 2, it will be appreciated that the invention also may be practiced with all the tool holding sections having the same outside diameter as the central section. Alternately, the invention also may be practiced with sections having more than two outside diameters may be assembled to form the EOAT 30 and the central section may include sections having different outside diameters (not shown).

Figure 3:
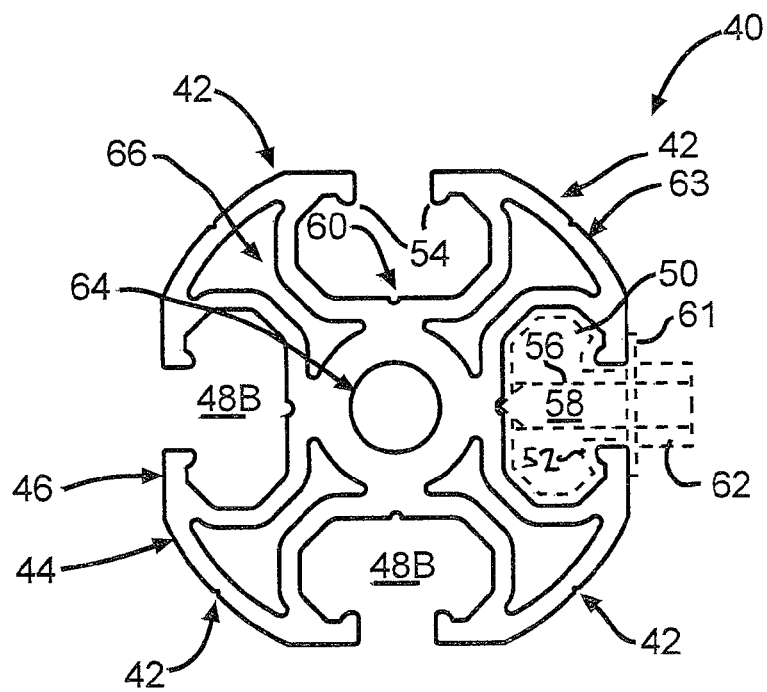
FIG. 3 is a cross sectional view of the sections utilized in the End-Of-Arm-Tooling shown in FIG. 2.

The present invention contemplates that the tool holding sections 32 and 34 and the central section 36 are formed from a channel 40 having a cruciform cross-section with arms of equal lengths, as best seen in the cross-sectional view of FIG. 3. While the section arms are illustrated as having the same lengths, it will be appreciated that the invention also may be practiced with arms having different lengths (not shown). The section 34 includes four lobes 42, each of which has an arcuate shaped outer center portion 44. The arcuate shaped portions 44 terminate in flat ends 46 that support various brackets. A plurality of partially closed slots 48 extend in an axial direction between the lobes 42 and are shaped to receive channel nuts 50, one of which is shown in phantom in FIG. 3. Grooves 52 formed in the top surface of the channel nut receive corresponding longitudinal lips 54 formed upon the inside surface of the slots 48. As also shown in phantom, one or more threaded transverse bores 56 are formed through the channel nut 50. The channel nut bores 56 receive set screws 58, also shown in phantom, that extend through the channel nut 50 and engage an inner longitudinal groove 60 formed in the base of each of the slots 48 to secure the channel nut within the slot by forcing the channel nut 50 against the inner surface of the slot carrying the nut. The set screws 58 also are utilized to mount brackets and tools upon the channel 40. This is illustrated in Fig. FIG. 3 where a bracket 61, which is shown in phantom, is disposed between a set screw head 62 and the outer surface of the channel nut 50. At least one outer longitudinal groove 63 is formed in the arcuate shaped outer portion 44 of each of the lobes 42. The outer grooves 63 may be utilized to guide external pneumatic and/or hydraulic lines (not shown) mounted upon the channel or to attach tools to the section. A central bore 64 extends in the axial direction through the section while each of the lobes 42 encloses an interior void 66. The central bore 64 may be utilized as a conduit for pneumatic and/or hydraulic lines. The bore 64 and lobe voids 66 reduce the weight of the section without decreasing the section strength.

The arcuate shaped outer portions of the channels utilized in the present invention allow for direct mounting of pneumatic fittings while also providing greater flexibility in routing of the hoses to grippers or vacuum cups. This, in turn, allows almost limitless applications.

Figure 4:
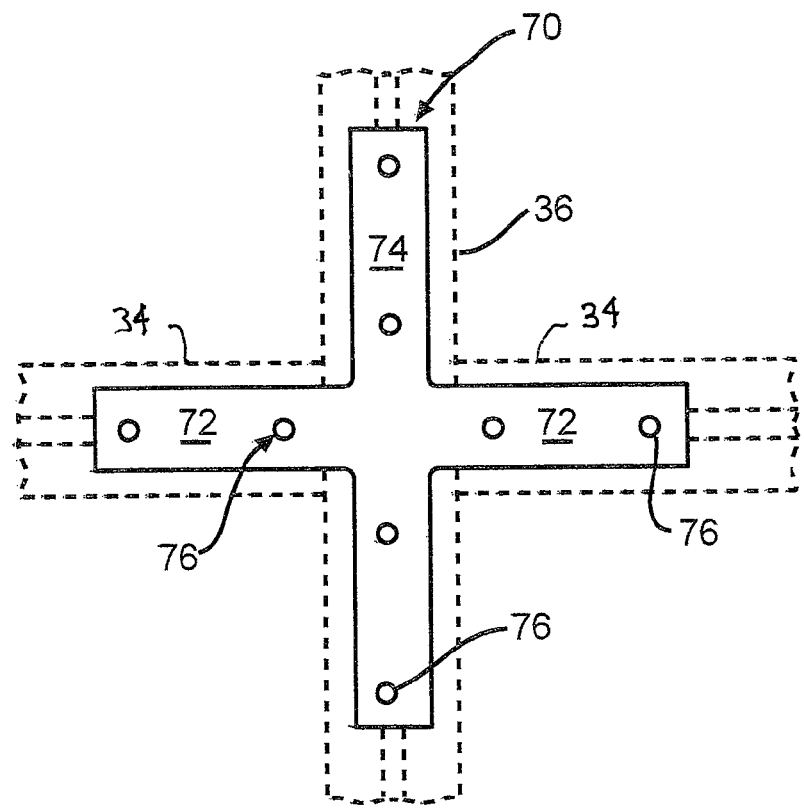
FIG. 4 is a plan view of a perpendicular mounting bracket for use with the section shown in FIG. 3.
Figure 5:
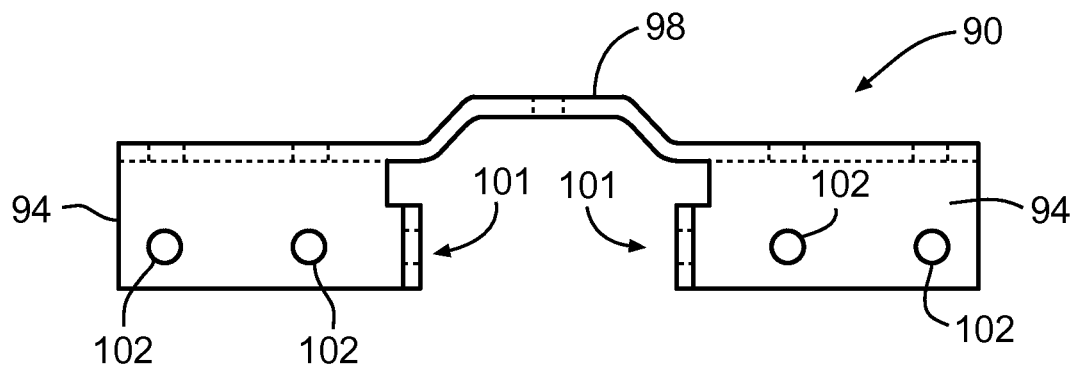
FIG. 5 is a side view of another perpendicular mounting bracket for use with the section shown in FIG. 3.

As described above, the invention contemplates using various shaped brackets to connect the tool sections to the central section and to mount tools upon the sections. There is illustrated in FIG. 4, a cruciform shaped bracket 70 having two equal length arms 72 extending perpendicularly from a central portion 74. As shown in phantom in FIG. 4, the bracket is utilized to secure two tool holding sections 34 to the central section 36. Each of the bracket arms 72 has two apertures 76 formed therethrough while the central portion 74 has four apertures formed therethrough. The apertures 76 receive set screws that extend into channel nuts carried by the slots in each of the sections 34 and 36, as shown in FIG. 3. While one bracket 70 is shown in FIG. 4, the invention also may be practiced with two brackets mounted on opposite sides of the central section (not shown).

Because of the shape of the bracket 70, each of the tool holding sections 34 extends perpendicularly from the central section 36. However, it will be appreciated that the invention also contemplates brackets with arms that extend at other than 90 degree angles from the center portion of the bracket (not shown). The invention also contemplates brackets with adjustable angles, such as the bracket 80 shown in FIG. 2 that includes an arcuate slot 82. The arcuate bracket slot 82 allows adjustment of the angle between the tool holding section and the central section while an aperture 76 anchors one end of the tool holding section 32, as also shown in FIG. 2. Two additional apertures 76 allow attachment of the bracket 80 to the central section 36. It will be noted that the bracket 80 extends across the central section 36 and supports a second tool holding section.

Figure 6:
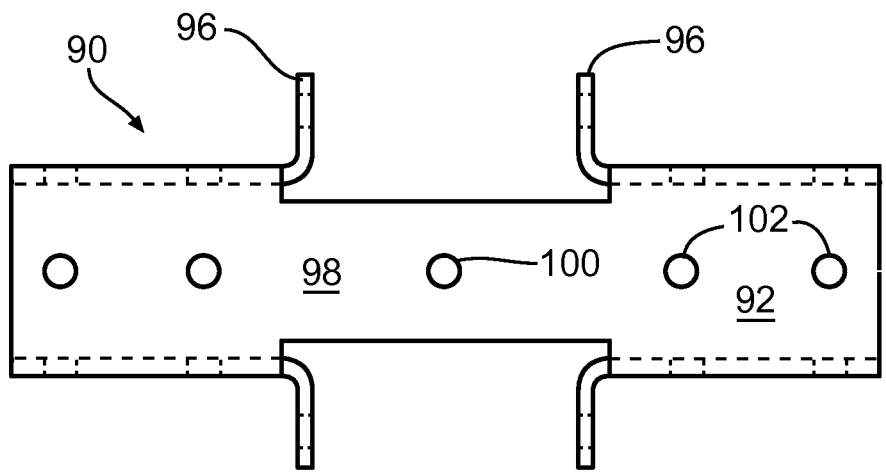
FIG. 6 is a plan view of the mounting bracket shown in FIG. 5.
Figure 6A:
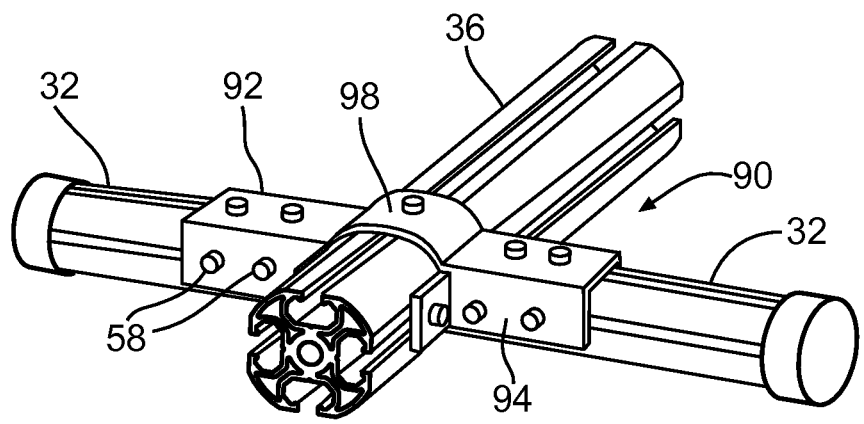
FIG. 6A illustrates an application of the mounting bracket shown in FIGS. 5 and 6.
Figure 7:
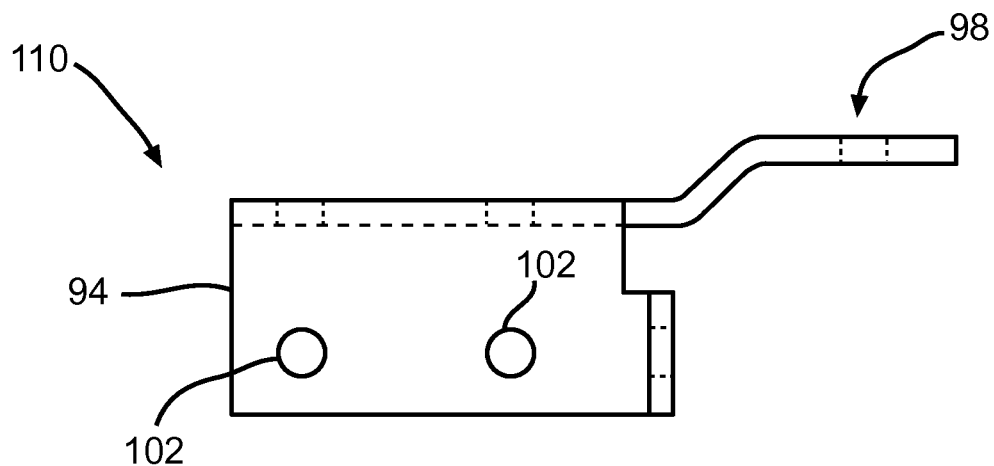
FIG. 7 is a side view of an alternate embodiment of the bracket shown in FIGS. 5 and 6.

Another bracket is shown generally at 90 in FIGS. 6 and 7. The bracket 90 also is used to attach two tool holding sections to a central section and is formed from a piece of U-shaped channel having central portion 92 and two flanges 94 extending perpendicular from the edges of the central portion. The mid portion of each of the flanges 94 is cut and the inner ends are folded back to form a pair of ears 96. Additionally, the portion of the central portion 92 between the ears 96 is formed into a semi-arcuate shaped bridge 98. A single central aperture 100 is formed through the center of the bridge 98 while a supporting aperture 101 is formed through each of the ears 96. Additionally, pairs of additional auxiliary apertures 102 are formed through the ends of the central portion 92 and each of the flanges 94. The bracket 90 is secured to the central section 36 by set screws (not shown) passing through the central aperture 100 and the ear apertures 101. Additional set screws (not shown) pass through selected auxiliary apertures 102 to position tool holding sections (not shown) or tools (not shown) that are inserted into the ends of the brackets. The tool holding sections and/or tools are secured by additional set screws that pass trough the auxiliary apertures 102. The attachment of the bracket 90 to the central section 36 is illustrated in FIG. 2, and, in more detail, the attachment of two tool bearing sections 32 to a central section 36 is shown in FIG. 6A.

Figure 8:
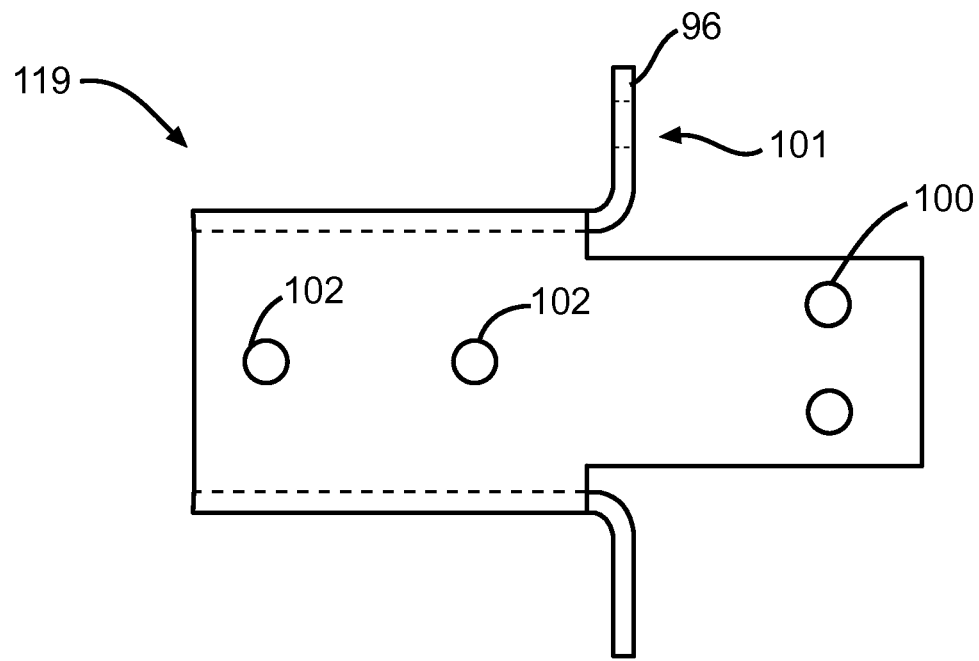
FIG. 8 is a plan view of the mounting bracket shown in FIG. 7.

An alternate embodiment of the bracket 90 is shown at 110 in FIGS. 7 and 8, where components that are same as components shown in the previous figures have the same numerical identifiers. The bracket 110 is essentially half of the bracket 90 described above. However, two central apertures 100 are provided to secure the bracket to a central section (not shown) along with the ear apertures 101.

Figure 9:
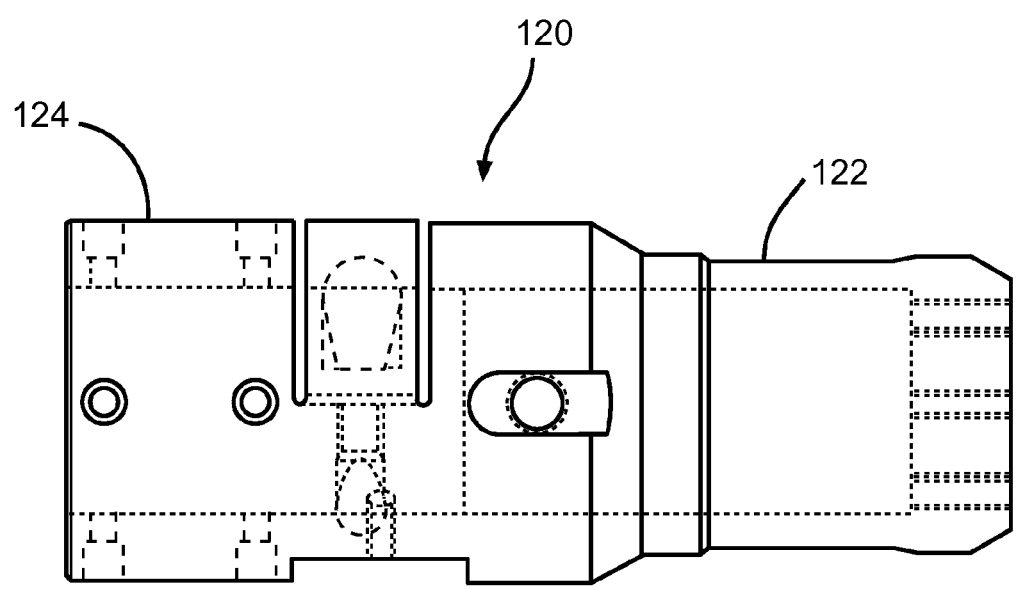
FIG. 9 is a side view of a quick change interface that may be used to attach the End-Of-Arm-Tooling shown in FIG. 2 to the industrial robot shown in FIG. 1.
Figure 10:
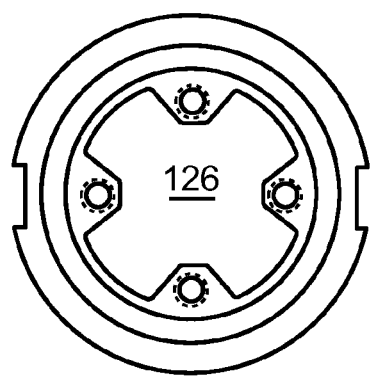
FIG. 10 is an end view of the interface shown in FIG. 9.
Figure 11:
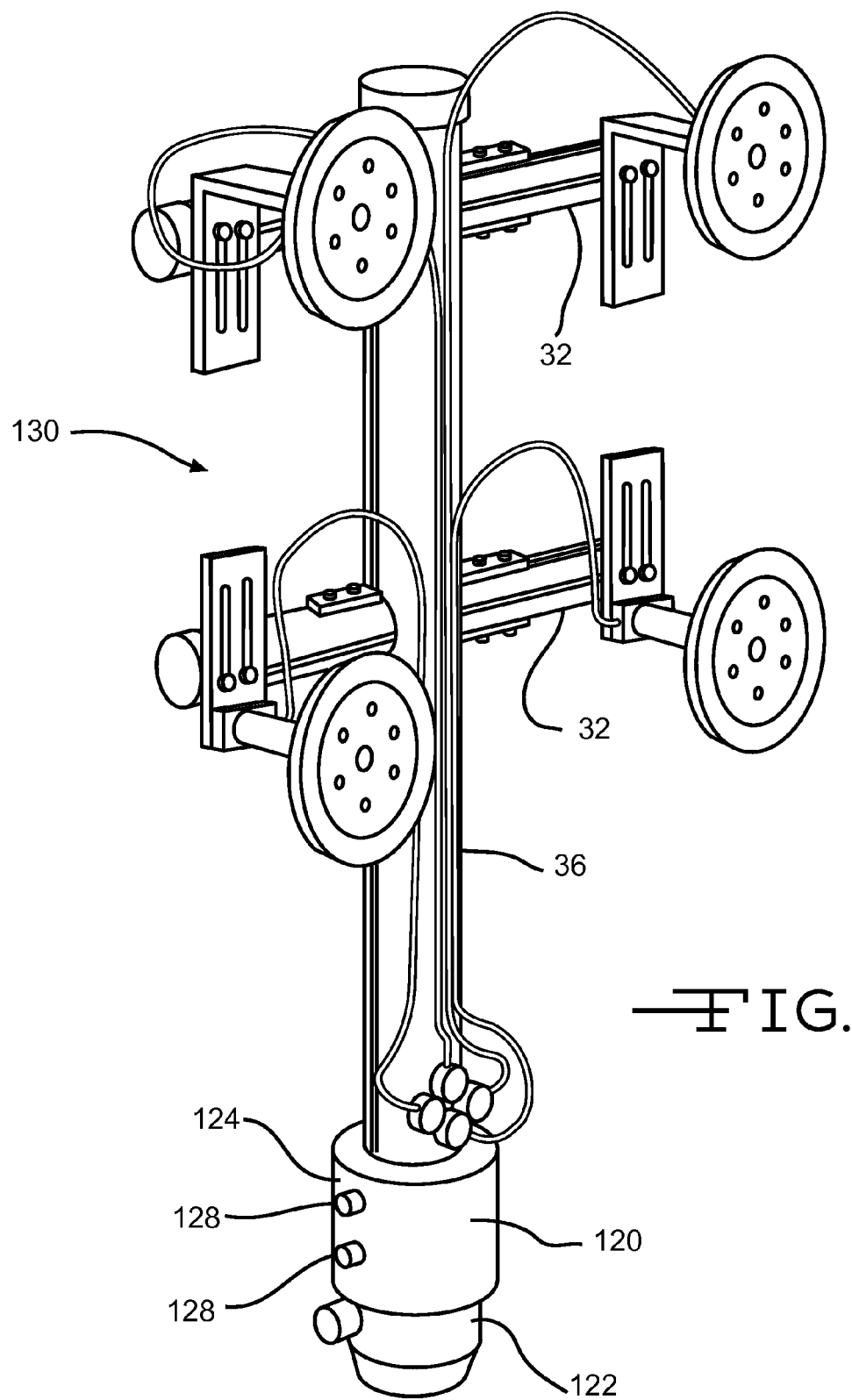
FIG. 11 illustrates an alternate configuration of the End-Of-Arm-Tooling shown in FIG. 2.

A quick change interface 120 for attaching an end of the central section 36 to the robot chuck 29 is shown in FIGS. 9 and 10. A first end 122 of the interface 120 that is to the right of FIG. 9 is secured to the robot chuck 29 in a conventional manner. A second end 124 of the interface 120 that is to the left of FIG. 9 is attached to an end of the central section 36. As best seen in FIG. 10, a bore 126 having a cruciform shape extends axially through the interface 120. The end of the central section 36 is inserted into the bore, as shown in FIG. 11, and secured therein by a plurality of setscrews 128 carried by the interface 120. The setscrews 128 are received by threaded bores in channel nuts disposed within the slots of the central section (not shown).

The flexibility of the present invention for configuration of an EOAT is illustrated in FIG. 11 where an alternate embodiment 130 of the EOAT is shown. The alternate embodiment 130 includes less tools and a different configuration than the embodiment 30 shown in FIG. 2.

Figure 12:
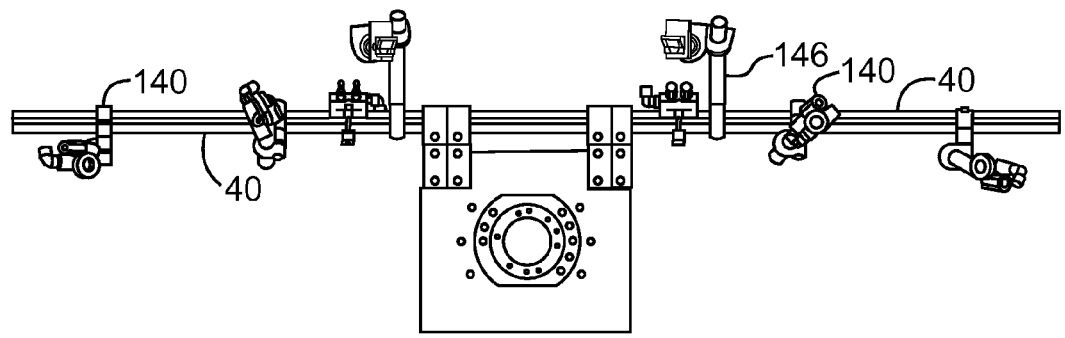
FIG. 12 is a plan view of an alternate embodiment of a mounting arrangement for End-Of-Arm-Tooling shown in FIG. 2.
Figure 13:
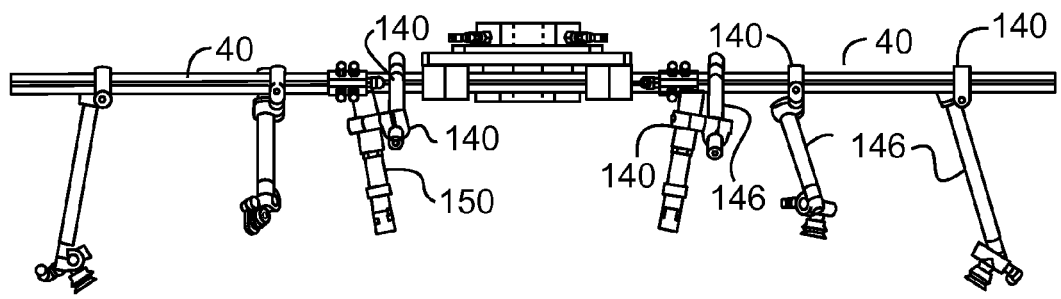
FIG. 13 is a side view of the alternate embodiment of the mounting arrangement shown in FIG. 12.
Figure 14:
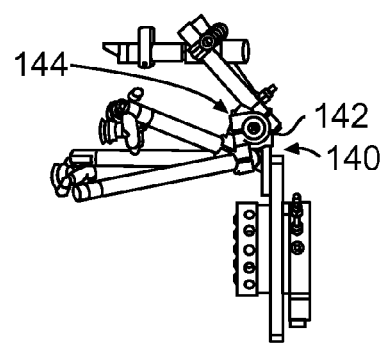
FIG. 14 is an end view of the alternate embodiment of the mounting arrangement shown in FIG. 12.

An alternate embodiment for a mounting bracket is illustrated at 140 in FIGS. 12 through 14, where components that are similar to components shown in the other figures have the same numerical identifiers. As best seen in FIG. 14, the mounting bracket 140 includes a circular clamp portion 142 that corresponds to the arcuate shaped outer portions 44 of the channels 40. A threaded portion 144 receives a screw that is utilized to both clamp the bracket 140 upon the channel 40 and to secure an extender tube 146 or a tool (not shown) to the mounting bracket. As shown in FIGS. 12 through 14, various tools are mounted upon the outer ends of the extender tubs 146. The circular clamp portion 142 of the bracket extends around the circumference of the channel 40 and co-operates with the arcuate cross sectional shape of the channel to frictionally secure the bracket upon the channel while also allowing orientation of the tool and/or extender tube 146 at an angle relative to the channel. Additionally, the invention also contemplates using a second mounting bracket 140 to attach a second extender tube 150 on the end the extender tube that is carried by the channel 40, as shown in FIG. 13. The second mounting bracket allows orientation of the second extender tube 150 at an angle to the first extender tool 146 and thus adds an additional degree of freedom for mounting a tool with relation to the channel 40. Furthermore, the second mounting bracket may mounted directly upon the mounting bracket carried by the channel, if needed (not shown).

The invention further contemplates one or more apertures extending through the circular clamp portion in a radial direction (not shown). One of the apertures receives a set screw that would extend through the circular clamp portion and be received by a corresponding channel nut carried by an adjacent section channel (also not shown). Thus the set screw and channel nut enhance the frictional holding capability of the circular clamp portion of the bracket. A plurality of apertures spaced uniformly about the circumference of the circular clamp portion (not shown) provide adjustable positioning of the clamp upon the section.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. Thus, while the invention was illustrated and described as being utilized with a six-axis industrial robot, it will be appreciated that the invention also may be used in conjunction with other types of robots.

What is claimed is:

1. An End-Of-Arm-Tooling for a robot comprising:
a section of channel having a generally cruciform cross sectional shape that includes lobes having an exterior mounting surface that includes an arcuate-shaped center portion surface that terminates in flat end portions, said arcuate-shaped portion describing an arc of less than ninety degrees, one end of said section of channel being adapted to be attached to a robot arm; and
at least one tool mounted upon said section of channel.

2. The End-Of-Arm-Tooling according to claim 1 further including a bracket with an arcuate clamp portion, said arcuate portion extending over said channel and co-operating with said arcuate shaped lobes to allow positioning of said bracket upon said section of channel to obtain a desired angle with said channel, said bracket also including at least one arm extending from said clamp portion, said arm being formed from U-shaped channel with said tool being mounted upon said arm.

3. The End-Of-Arm-Tooling according to claim 2 wherein said section of channel is a first section of channel and further wherein the tooling includes a second section of channel between said bracket and said tool.

4. The End-Of-Arm-Tooling according to claim 2 wherein said channel also includes at least one slot extending longitudinally along said channel; said slot adapted to receive at least one channel nut that is operative to secure one of a bracket and a tool to said channel.

5. The End-Of-Arm-Tooling according to claim 1 wherein said channel also includes at least one slot extending longitudinally along said channel; said slot adapted to receive at least one channel nut that is operative to secure one of a bracket and a tool to said channel.

6. The End-Of-Arm-Tooling according to claim 5 wherein said slot includes a pair of lips formed upon opposite surfaces that extend over a portion of said channel nut, said lips being received by corresponding grooves formed in said channel nut and a longitudinal groove extending along the base the of said slot and further wherein said channel nut includes a threaded bore extending therethrough, the threaded bore receiving a set screw which engages said longitudinal groove and forces said channel nut against said lips to secure said channel nut within said slot.

7. The End-Of-Arm-Tooling according to claim 5 including a plurality of grooves positioned equally about the circumference of said channel and separated by said lobes.

8. The End-Of-Arm-Tooling according to claim 5 further including a longitudinal bore formed through said channel, said bore adapted to receive at least one of pneumatic and hydraulic lines.

9. The End-Of-Arm-Tooling according to claim 5 further including a cruciform shaped bracket attached to said channel with at least one channel nut and set screw, said cruciform shaped bracket having a plurality of arms extending therefrom, each of said arms having at least one aperture formed therethrough, said aperture adapted to secure one of a bracket and tool to said arm.

10. The End-Of-Arm-Tooling according to claim 9 wherein said channel is a first channel and further wherein a second channel is attached to said arm of said cruciform shaped bracket.

11. The End-Of-Arm-Tooling according to claim 5 further including a bracket with Currently Amended arcuate clamp portion, said arcuate portion extending over said channel and co-operating with said arcuate shaped lobes to allow positioning of said bracket upon said section of channel to obtain a desired angle with said channel, said bracket also including at least one arm extending from said clamp portion, said arm being formed from U-shaped channel with said tool being mounted upon said arm.

12. An End-Of-Arm-Tooling for a robot comprising:
a section of channel having a generally cruciform cross sectional shape that includes lobes having an exterior mounting surface that includes an arcuate-shaped center portion surface that terminates in flat end portions, said arcuate-shaped portion describing an arc of less than ninety degrees, one end of said section of channel being adapted to be attached to a robot arm;
a bracket attached to said section of channel;
a second section of channel having a generally cruciform cross sectional shape that also includes lobes having an arcuate-shaped portion, one end of said second section of channel being attached to said bracket; and at least one tool mounted upon said second section of channel.

13. The End-Of-Arm-Tooling according to claim 12 further including a bracket with an arcuate clamp portion, said arcuate portion extending over said channel and co-operating with said arcuate shaped lobes to allow positioning of said bracket upon said section of channel to obtain a desired angle with said channel, said bracket also including at least one arm extending from said clamp portion, said arm being formed from U-shaped channel with said tool being mounted upon said arm.

14. The End-Of-Arm-Tooling according to claim 13 said second channel also includes at least one slot extending longitudinally along said channel; said slot adapted to receive at least one channel nut that is operative to secure one of a bracket and a tool to said second channel.

15. A method for attaching a tool to a robot comprising the steps of:
 (a) providing a robot having a controllable movable arm;
 (b) attaching a section of channel having a generally cruciform cross sectional shape that includes lobes having an exterior mounting surface that includes an arcuate-shaped center portion surface that terminates in flat end portions with the arcuate-shaped portion describing an arc of less than ninety degrees to the robot arm; and
 (c) attaching a tool to the section of channel.

16. The method according to claim 15 wherein step (c) includes providing a bracket with an arcuate clamp portion, said arcuate portion extending over said channel and co-operating with said arcuate shaped lobes to allow positioning of said bracket upon said section of channel to obtain a desired angle with said channel, said bracket also including at least one arm extending from said clamp portion, said arm being formed from U-shaped channel with said tool being mounted upon said arm.

17. The method according to claim 16 wherein the section of channel is a first section of channel and further wherein the tooling includes a second section of channel between the bracket and the tool.

18. The method according to claim 15 wherein the section of channel includes at least one slot extending longitudinally along the channel; the slot adapted to receive at least one channel nut that is operative to secure one of a bracket and a tool to the channel in step (c).

\* \* \* \* \*